/ 1/76     XR     3,960,582

United States Patent [19]
Ball et al.

[11] 3,960,582
[45] June 1, 1976

[54] LOW POROSITY CEMENT AND PROCESS FOR PRODUCING SAME

[75] Inventors: Frank J. Ball, Charleston; David V. Braddon, Charleston Heights; Lynden J. Stryker, Mount Pleasant, all of S.C.

[73] Assignee: Westvaco Corporation, New York, N.Y.

[22] Filed: Apr. 21, 1975

[21] Appl. No.: 569,986

[52] U.S. Cl. .................................. 106/90; 106/97; 106/98; 106/315
[51] Int. Cl.² .......................................... C04B 7/35
[58] Field of Search .................. 106/315, 90, 97, 98

[56]        References Cited
          UNITED STATES PATENTS
3,689,294   9/1972   Brunauer ............................ 106/315
3,782,984   1/1974   Allemand et al. .................. 106/315

*Primary Examiner*—J. Poer
*Attorney, Agent, or Firm*—Richard L. Schmalz; Ernest B. Lipscomb, III

[57]                ABSTRACT

A method is disclosed for making low-porosity, free-flowing cement pastes with extended set times, improved workability and reduced expansion due to alkali aggregate reactions by combining hydraulic cements, especially portland-type cements, ground without gypsum with from 0.1 to about 1.0% of an alkali or alkaline earth lignosulfonate or sulfonated lignin, and 0.1 to 2.0% of an alkali bicarbonate, and combining with 20 to 40% water. Mixtures of aggregates with such low-porosity pastes made according to this process produce very workable mortars and concretes with extended set times and upon hardening have reduced expansion.

11 Claims, No Drawings

LOW POROSITY CEMENT AND PROCESS FOR PRODUCING SAME

BACKGROUND OF THE INVENTION

1. Field of the Invention

This invention relates to a low-porosity cement and methods for making same. More particularly, this invention relates to methods for producing low porosity cement from a gypsum-free hydraulic cement which includes alkali bicarbonates and lignosulfonates and gives cement pastes having an extended set time, reduced expansion due to alkali aggregate reactions and other benefits.

Cements are produced by calcining suitable raw materials, generally a mixture of calcareous and argillaceous materials, to produce a sintered "clinker." Portland types are by far the most important cements in terms of quantity produced. The clinker is conventionally mixed with small amounts of gypsum, i.e., up to about 9%, and ground, usually in some type of ball mill, to a finely divided state having a relatively large surface area to yield the finished cement.

The ground clinker containing gypsum is mixed with the proper amount of water to form a paste. Properly made cement pastes set within a few hours and then harden slowly. Cement pastes are combined with aggregates, either fine aggregates or sand to produce mortars or larger aggregates as gravel, stone and the like to produce concrete. The paste acts as the cementing material and its composition has a decisive effect on the strength and other properties of the resultant mortar or concrete.

One of the main factors that determine the properties of hardened cement pastes and, consequently of mortar and concrete, is the water-to-cement ratio of the fresh mix. The lower the water-to-cement ratio the higher the strength, lower the shrinkage, and better the frost and corrosion resistance. The desirability of having a low water-to-cement ratio, the conventional practice being normally between about 0.4 and 0.6, is to obtain a concrete or mortar having minimum shrinkage and increased ultimate strength. However, simply lowering the water-to-cement ratio of conventional portland cements is not the answer.

Thus, unfortunately the fact that a decrease of the water content improves the properties of the hardened concrete can be used only to a limited degree as a decrease of the water content results simultaneously in a deterioration of the workability of the concrete mix. The requirements for sufficient workability of the fresh concrete mix are the reasons for the fact that the water content of concrete mixes used in practical applications lies far above the amount that is needed for complete hydration of cement. While the amount of water needed for complete hydration of cement is stated to be about 22-23%, the lowest amount of water used in conventional concrete practice lies in the vicinity of 40% and usually range between 45% and 80%.

Even through the use of conventional water reducers (mainly lignosulfonate from spent sulfite pulping liquors), a water reduction of only about 10% of the water added is possible. The water remaining in the concrete mix made from ordinary cement is still far above the requirements needed for complete hydration of the cement. Thus, if the water content could be further reduced without deterioration of the workability or without introducing other detriments, a significant gain in strength and an improvement of some other properties of the hardened concrete could be reached.

2. The Prior Art

Efforts to produce low porosity cements by reduction of water-to-cement ratio have been long attempted. For example, U.S. Pat. No. 2,174,051 to Winkler teaches that an increase in strength is obtained with a low water-to-cement ratio and that certain organic compounds such as tartaric acid, citric acid and the like may be added to regulate the setting time. U.S. Pat. No. 2,374,581 to Brown teaches that small amounts of tartaric acid, tartartes and bicarbonates may be added to ordinary (gypsum containing) portland cement at conventional water-to-cement ratios to retard the rate of set at high temperatures in the cementing of oil wells.

U.S. Pat. No. 2,646,360 to Lea teaches that an alkali metal or alkaline earth metal lignin sulfonate and an alkali metal salt of an inorganic acid (e.g., sodium carbonate) may be added to a gypsum containing cement slurry to reduce water loss and thus the amount of water initially needed.

U.S. Pat. No. 3,118,779 to Leonard, on the other hand, teaches that sodium bicarbonate when added to a portland cement-Type III (containing gypsum) without lignin being present acts as an accelerator.

U.S. Pat. No. 3,689,296 to Landry teaches that formaldehyde modified calcium lignosulfonates may be used in portland cements to replace all or part of the gypsum usually added and the amount of water required for a mix of a given degree of fluidity is reduced.

U.S. Pat. No. 3,689,294 to Braunauer reflects more recent effort to produce low porosity cements by grinding portland-type cements without gypsum to a specific surface area between 6,000 – 9,000 Blaine ($cm.^2/gm.$) and mixing with alkali or alkaline earth lignosulfonate, alkali carbonate and water.

U.S. Pat. No. 3,782,984 to Allemand et al. teaches that the addition of 0.5 to 5% of alkali metal bicarbonates to portland-type cements accelerates the setting time.

The French publication *Les Adjuvants Du Ciment* edited by Albert Joisel (Soisy, France 1973 published by the author) at page 102 teaches that sodium bicarbonate in ordinary portland cement is a retarder and again at page 132 that sodium bicarbonate may be added to portland cement with gypsum in the usual way.

The above-described prior art is intended as exemplary and not inclusive of all low porosity cement art.

It is, therefore, a general object of this invention to provide processes for making an improved low porosity, free-flowing cement paste.

Another object of this invention is to provide concretes and mortars containing a high strength, low porosity portland cement without gypsum with improved workability, extended set time and reduced expansion due to alkali aggregate reactions.

A further object of this invention is to provide an improved low porosity, free-flowing cement by including sodium bicarbonate as an additive.

Other objects, features and advantages of this invention will become evident from the following detailed description of the invention.

SUMMARY OF THE INVENTION

A process is disclosed for making low-porosity, free-flowing cement pastes which includes as one embodiment the mixing scheme of combining ground hydraulic cement without gypsum with from 0.1 to about 1.0% of an alkali or alkaline earth lignosulfonate or sulfonated lignin, and with 0.1 to 2.0% of alkali bicarbonate, and combining with 20 to 40% water. In an alternative embodiment, the alkali bicarbonate is blended with the cement and the lignin is added to the mix water and then the two combined. These processes show the desirability of using alkali bicarbonates in low porosity cement rather than alkali carbonates.

DETAILED DESCRIPTION OF THE INVENTION

The cement to which this invention is applicable is "hydraulic cements." Hydraulic cements include, but are not limited to, the portland cements, the natural cements, the white cements, the aluminous cements, the grappies cements, the hydraulic limes, and the pozzolanic cements including thos derived from industrial slags. The hydraulic cement which is most widely used is portland cement. Clinkers of the above-described types are ground to 3,500 cm.$^2$/gm. and finer, e.g., up to 9,000 cm.$^2$/gm.

To assist in obtaining the desired fineness, it is common practice in the cement industry to employ grinding aids which increase the efficiency of the grinding operations. Satisfactory grinding aids include, among others, water-soluble polyols such as ethylene glycols, polyethylene glycols, as well as, other watersoluble diols. The grinding aids are generally added to the clinker in an amount of from 0.005 to 1.0% based on weight of cement, and the ground cement may include a pack set inhibitor. Additional examples of grinding aids may be found in U.S. Pat. Nos. 3,615,785 and 3,689,294. Although grinding aids are typically used to make the cement, they do not form a part of the present invention.

The process of the present invention thus starts with a ground hydraulic cement without gypsum. Using the process of this invention, low porosity mortars and concretes may be made from the cement pastes. As used herein, the term "low porosity" cement is defined as a free-flowing and workable cement paste having a water-to-cement (w/c) ratio of below 0.40 down to about 0.2, with workable mortars and concrete preferably from 0.35 down to 0.25 w/c ratio.

The hydraulic cement without gypsum in one embodiment of the process is combined with from 0.1 to about 1.0%, preferably 0.3 to 0.8%, based on the weight of dry ground cement of an alkali or alkaline earth lignosulfonate or alkaline earth sulfonated lignin. The lignosulfonates are obtained as byproducts from sulfite pulping of woody materials. The waste liquors from such pulping contain large quantities of lignin and lignin products in conjunction with other materials. The sulfonated lignins, on the other hand, are produced by reacting lignins obtained from alkali pulping, acid hydrolysis or other known recovery process with an inorganic sulfite, e.g., sodium sulfite, whereby sulfonate groups are added to the lignin. For use in this invention, any of the various water-soluble sulfonated lignins or lignosulfonates may be employed. It is preferable, however, to utilize sulfonated lignins which are free of carbohydrate materials. Sulfonated lignins obtained from reaction of sulfites with alkali lignin do not contain any appreciable amounts of these carbohydrates and consequently may be employed as is. The sulfonated lignins may be converted into water-soluble alkaline earth salts, and used as such, as disclosed in U.S. Pat. No. 2,141,570.

In the alternative embodiments of the process, the sulfonated lignin may be combined with the ground cement or with the mix water or a portion of the sulfonated lignin may be added to the cement and a portion added in the mix water. No essential differences in results are observed when using any of these procedures. Therefore, a portion of the lignin may be combined with the ground cement and the remaining portion added to the mix water.

An alkali bicarbonate in the amount of 0.3 to 2.0%, preferably 0.7 to 1.5%, by weight based on the dry cement is employed. Sodium bicarbonate is preferred. It is unimportant how the bicarbonate is added, such as by straight inclusion of a bicarbonate or by adding soda ash and carbonating. It was found that when the alkali bicarbonate was used an unexpected increase in set time and workability over the use of alkali carbonate is obtained at water-to-cement ratios below 0.4. The amount of water used is 20 to 40% by weight based on dry cement or a water-to-cement ratio (w/c) of 0.4 to 0.2.

It may also be desirable in some cases to add a third component to the low porosity system to obtain substantial lengthening of the plastic period for mortars and concretes while still having adequate one-day compressive strengths. These components used in small amounts, for example, 0.1% – 0.2%, are primarily of two classes of materials; surfactants and conventional water reducer/set retarders. Anionic surfactants may include the sodium salt of sulfonated alkalidiphenyloxide, while nonionic surfactants include polyethylene glycol and the like. Materials of the water reducer/set retarder class include carbohydrates like wood molasses sucrose, dextrose, and hydroxy acids like sodium gluconate. Typical air detraining agents, such as tributyl phosphate, may also be used to advantage in low porosity systems.

Another important aspect of this invention is that it was found that the addition of alkali bicarbonate substantially reduces the potential for the alkali-aggregate reaction that take places when alkali (NaOH) is formed in the cement. The potential expansion when using an alkali carbonate and bicarbonate in low porosity systems was measured using a highly reactive aggregate (crushed pyrex glass) according to the procedure outlined in A.S.T.M. C-227. The results demonstrated a reduced expansion of a low porosity mortar prepared with $NaHCO_3$ when compared to an equivalent $Na_2CO_3$ system. In addition, small quantities (0.05–1.5%) of lithium salts decrease the expansion of both alkali carbonate and bicarbonate containing low porosity pyrex glass mortars.

The practice of this invention may clearly be seen in the following examples.

EXAMPLE 1

This example is to illustrate the lengthened set time of cement paste made using an alkali bicarbonate rather than an alkali carbonate. A Type I portland cement clinker ground to 5,075 cm.$^2$/gm. (A.S.T.M. C-204) having the following analysis was used in this example:

|  | Clinker % |
|---|---|
| $SiO_2$ | 21.70 |
| $Al_2O_3$ | 6.06 |
| $Fe_2O_3$ | 2.51 |
| CaO | 67.5 |
| MgO | 0.99 |
| $Na_2O$ | 0.06 |
| $K_2O$ | 0.28 |
| Ignition Loss | 0.62 |
| Insoluble | 0.14 |

The changes in physical properties (set time being the most dramatic) of cement pastes using alkali carbonates and alkali bicarbonates are illustrated in Table I. The amount of sulfonated lignin was held constant at 0.45% by weight based on the cement, and the water-to-cement ratio was 0.25. The amount of alkali carbonate was adjusted to provide equivalent molar quantities of $CO_3^=$.

TABLE I

COMPARISON OF ALKALI CARBONATES AND BICARBONATES ON THE PROPERTIES OF LP CEMENT PASTES

| Run No. | Type Carbonate | % | Flow* | Setting Time (Min.) | Compressive Strength (p.s.i.) 1 Day | 7 Days |
|---|---|---|---|---|---|---|
| 1 | $Na_2CO_3$ | 1.26 | 4+ | 13 | 10,400 | 11,600 |
| 2 | $NaHCO_3$ | 1.0 | 4+ | 38 | 10,200 | 18,950 |
| 3 | $K_2CO_3 \cdot 1.5\ H_2O$ | 1.97 | 4 | 12 | 10,900 | 13,500 |
| 4 | $KHCO_3$ | 1.19 | 4+ | 19 | 9,600 | 16,580 |

Note: *Arbitrary flow units, see explanation below and are those used in all the examples. The consistencies of the cement pastes shown in Table I are according to the following scale:
1. Paste barely plastic, moves with difficulty even when vibration is applied.
2. Paste plastic but not freely flowing —flows easily when vibration is applied.
3. Paste freely flowing, but thick, can be poured without vibration.
4. Paste easily flowing.

The results in Table I demonstrate increases in set time and superior 7-day compressive strength for bicarbonate systems over carbonate systems.

EXAMPLE 2

This example demonstrates that the sulfonated lignin may be dry blended or dissolved in the mix water. In this example, a portion of the clinker from Example 1 was ground to a Blaine surface of 4,525 cm.$^2$/gm. The mixing scheme designation in Table II denotes mixing all of the components within a set of parentheses and then mixing with the next component or components. For example, Run No. 1 in Table II designates blending the cement (C), the sulfonated alkali lignin (LS) and the alkali carbonate (AC), in this run; the alkali carbonate was sodium bicarbonate, and subsequently mixing the water. The amount of sulfonated lignin was held constant at 0.35% by weight based on the cement, and the water-to-cement ratio was 0.25.

TABLE II

EFFECTS OF MIXING SEQUENCE ON THE PROPERTIES OF LP CEMENT PASTES

| Mixing Scheme | Type Carbonate | % | Flow | Setting Time (Min.) | Compressive Strength (p.s.i.) 1 Day | 7 Days |
|---|---|---|---|---|---|---|
| 1. (C + LS + AC) + W | $NaHCO_3$ | 0.80 | 4+ | 32 | 9,200 | 17,250 |
| 2. (C + AC) + (LS + W) | $NaHCO_3$ | 0.80 | 4+ | 36 | 10,700 | 18,350 |

The data in Table II clearly demonstrate that the sulfonated lignin may be added to either the mix water or dry blended with the cement without significantly altering the paste properties.

EXAMPLE 3

This example further illustrates the superior low porosity cement pastes prepared using $NaHCO_3$ instead of $Na_2CO_3$ from ground cement with varying surface areas using Type I clinkers from various sources. Table III demonstrates the comparative longer set times and higher 7-day compressive strengths for the $NaHCO_3$ low porosity cement systems. The water-to-cement ratio was 0.25 in each Run. The amount of alkali carbonate was adjusted to provide approximate equivalent molar quantities of $CO_3^=$ for each clinker at each surface area.

TABLE III

EFFECTS OF DIFFERENT CLINKER AND SURFACE AREA ON LP CEMENT PASTE PROPERTIES

| Clinker | Surface Area Cm.$^2$/gm. | Type Carbonate | % | Flow | Setting Time (Min.) | Compressive Strength (p.s.i.) 1 Day | 7 Days |
|---|---|---|---|---|---|---|---|
| B[1] | 6,500 | $NaHCO_3$ | 1.20 | 4 | 31 | 10,100 | 15,400 |
| B[1] | 6,500 | $Na_2CO_3$ | 1.60 | 4 | 18 | 11,700 | 12,200 |
| A[2] | 5,650 | $NaHCO_3$ | 0.60 | 4 | 49 | 7,500 | 19,550 |
| A[2] | 5,650 | $Na_2CO_3$ | 0.76 | 2 | 20 | 10,200 | 14,050 |
| C[3] | 4,800 | $NaHCO_3$ | 1.00 | 4+ | 63 | 11,800 | 17,900 |

TABLE III-continued

EFFECTS OF DIFFERENT CLINKER AND SURFACE AREA ON LP CEMENT PASTE PROPERTIES

| Clinker | Surface Area Cm.²/gm. | Type Carbonate | % | Flow | Setting Time (Min.) | Compressive Strength (p.s.i.) 1 Day | 7 Days |
|---|---|---|---|---|---|---|---|
| C³ | 4,800 | $Na_2CO_3$ | 1.26 | 4 + | 32 | 12,500 | 13,200 |

Notes:
[1] 0.80% sulfonated lignin.
[2] 0.45% sulfonated lignin.
[3] 0.50% sulfonated lignin.

EXAMPLE 4

The use of alkali bicarbonates rather than alkali carbonates also improves the fluidity in cases where marginal fluidity occurs. The examples in Table IV illustrate these points wherein equimolar amounts of $CO_3^=$ were mixed with each of the ground clinkers at each surface area.

TABLE IV

FLOW ENHANCEMENT OF LP CEMENT PASTES PREPARED WITH ALKALI BICARBONATES

| Clinker | Surface Area Cm.²/gm. | Type Carbonate | % | Flow | Setting Time (Min.) | Compressive Strength (p.s.i.) 1 Day | 7 Days |
|---|---|---|---|---|---|---|---|
| A¹ | 5,650 | $Na_2CO_3$ | 0.76 | 1–2 | 9 | 8,800 | 13,150 |
| A¹ | 5,650 | $NaHCO_3$ | 0.60 | 4 | 35 | 9,700 | 18,000 |
| C² | 5,325 | $Na_2CO_3$ | 1.26 | 3 | 13 | 11,400 | 13,500 |
| C² | 5,325 | $NaHCO_3$ | 1.0 | 4 + | 59 | 12,500 | 13,350 |

Notes:
[1] 0.45% sulfonated lignin.
[2] 0.50% sulfonated lignin.

These results show that cement pastes made with ground clinkers using sodium bicarbonate had superior flow properties.

EXAMPLE 5

Extension of setting times using bicarbonates are also observed if lignosulfonates isolated from sulfite waste liquors are employed. Overall properties are, however, superior if sulfonated alkali lignins are utilized (compare Examples 1–4 with Example 5 below).

TABLE V

COMPARISON OF ALKALI BICARBONATE AND ALKALI CARBONATE WITH A LIGNOSULFONATE DERIVED FROM SULFITE PULPING

| Type Carbonate | % | Flow | Setting Time (Min.) | Compressive Strength (p.s.i.) 1 Day | 7 Days |
|---|---|---|---|---|---|
| $Na_2CO_3$ | | 2 | 32 | 10,200 | 15,250 |
| $NaHCO_3$ | | 2 | 72 | 500 | 7,550 |

EXAMPLE 6

This example clearly shows that a low porosity, ground pyrex glass mortar prepared with $NaHCO_3$ expands significantly less when compared to the corresponding low porosity mortar using $Na_2CO_3$. Samples C-1 and C-2 in Table VI demonstrate the reduced 14-day and 28-day expansion observed when $Na_2CO_3$ is replaced with $NaHCO_3$ (to give equimolar $CO_3^=$) in the low porosity pyrex glass mortar following the procedure outlined in A.S.T.M. C-227. Samples C-3 and C-4 show a significant reduced expansion in both the NaHCO₃ and $Na_2CO_3$ low porosity systems when a lithium salt ($Li_2CO_3$) is incorporated into the ground pyrex mortar. These results illustrate the reduced expansion of a low porosity pyrex mortar when replacing an alkali carbonate with an alkali bicarbonate and also a reduction in expansion of both the $Na_2CO_3$ and $NaHCO_3$ low porosity mortars when a lithium carbonate is incorporated into the mix.

TABLE VI

EXPANSION OF LOW POROSITY PYREX GLASS MORTAR BARS PREPARED WITH VARIOUS ALKALI CARBONATES

| Sample | Alkali Carbonate | % | Expansion, % 14 Days | 28 Days |
|---|---|---|---|---|
| C-1 | $NaHCO_3$ | 1.00 | 0.24 | 0.32 |
| C-2 | $Na_2CO_3$ | 1.26 | 0.50 | 0.56 |
| C-3 | $NaHCO_3$ | 1.00 | 0.03 | 0.04 |
| | $Li_2CO_3$ | 0.22 | | |
| C-4 | $Na_2CO_3$ | 1.26 | 0.01 | 0.08 |
| | $Li_2CO_3$ | 0.22 | | |

Notes:
Glass:Cement = 1.80
0.50% sulfonated lignin
w/c = 0.275

EXAMPLE 7

This example serves to illustrate the strength properties of low porosity (LP) mortars obtained using a process of this invention at acceptable water-to-cement ratios compared to ordinary water-to-cement ratios. The mortar was prepared using 2.25 parts fine sand per one part cement.

MORTAR RESULTS

| Cement | w/c | Compressive Strength (p.s.i.) 1 Day | 7 Days |
|---|---|---|---|
| LP¹ | .40 | 4,200 | 8,000 |
| LP¹ | .32 | 6,000 | 9,300 |
| LP¹ Type III | .27 | 6,000 | 8,800 |

-continued

MORTAR RESULTS

| Cement | w/c | Compressive Strength (p.s.i.) | |
|---|---|---|---|
| | | 1 Day | 7 Days |
| Ordinary | .60 | 2,300 | 7,100 |

Note:
¹0.50% sulfonated lignin, 1.0% NaHCO₃

The results show that good strength is maintained in the low porosity aggregates.

While the invention has been described and illustrated herein by reference to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. A method of making a free-flowing cement paste which comprises;
    a. combining ground hydraulic cement without gypsum with from 0.1 to about 1.5% of alkali or alkaline earth lignosulfonate or sulfonated lignin and from 0.1 to about 2.0% of an alkali bicarbonate, and
    b. mixing the combined materials from (a) with 20 to 40% of water, all percentages based on the dry weight of ground cement.

2. The method according to claim 1 wherein said lignin is present in an amount from 0.3 to 0.8%.

3. The method according to claim 1 wherein said alkali bicarbonate is present in an amount from 0.7 to 1.5%.

4. The method according to claim 1 wherein said alkali bicarbonate is sodium bicarbonate, said lignin is a sulfonated alkali lignin, and said hydraulic cement is a portland cement.

5. A method of making a free-flowing cement paste which comprises;
    a. combining ground hydraulic cement without gypsum with from 0.1 to about 2.0% of an alkali bicarbonate,
    b. combining 20 to 40% of water with from 0.1 to about 1.5% of alkali or alkaline earth lignosulfonate or sulfonated lignin, and
    c. thereafter mixing together the combined materials of steps (a) and (b), all percentages based on dry weight of ground cement.

6. The method according to claim 5 wherein said lignin is present in an amount from 0.3 to 0.8%.

7. The method according to claim 5 wherein a portion of said lignin is added to the water, and the remaining lignin is combined with the cement.

8. The method according to claim 5 wherein said alkali bicarbonate is present in an amount from 0.7 to 1.5%.

9. The method according to claim 5 wherein said alkali bicarbonate is sodium bicarbonate, said lignin is a sulfonated alkali lignin and said hydraulic cement is a portland cement.

10. A low porosity aggregate containing cement composition which comprises;
    a. a portland cement having a Blaine fineness above about 3,500 containing substantially no calcium sulfate.
    b. alkali bicarbonate in an amount from 0.1 to 2.0% by weight based on dry ground cement, and
    c. an alkali or alkaline earth lignosulfonate or sulfonated lignin in an amount of from 0.1 to 1.0% by weight based on ground cement,
    said aggregate-containing cement composition having been made at a water-to-cement ratio of between 0.4 and 0.2.

11. The aggregate containing cement composition of claim 10 wherein said alkali bicarbonate is sodium bicarbonate and is present in an amount from 0.7 to 1.5%, and said lignin is an alkali lignin and is present in an amount from 0.3 to 0.8%.

* * * * *